Oct. 1, 1963    W. E. CONLEY ETAL    3,105,589
BELT ALIGNING AND TENSIONING APPARATUS
Original Filed Feb. 13, 1956    4 Sheets-Sheet 3

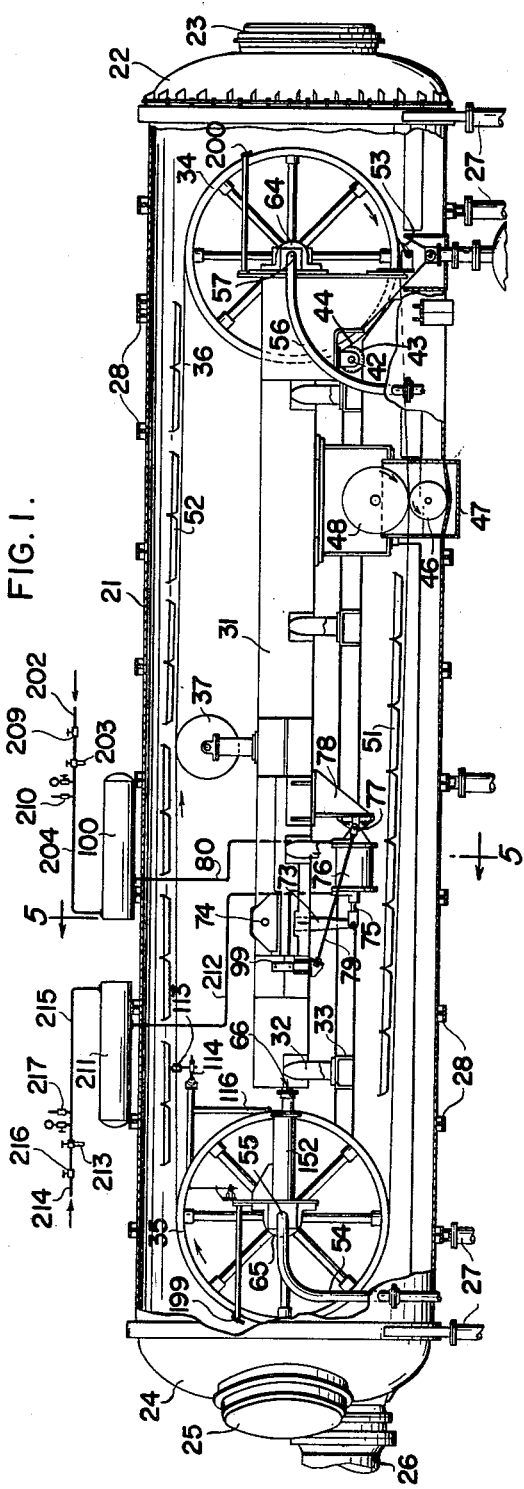

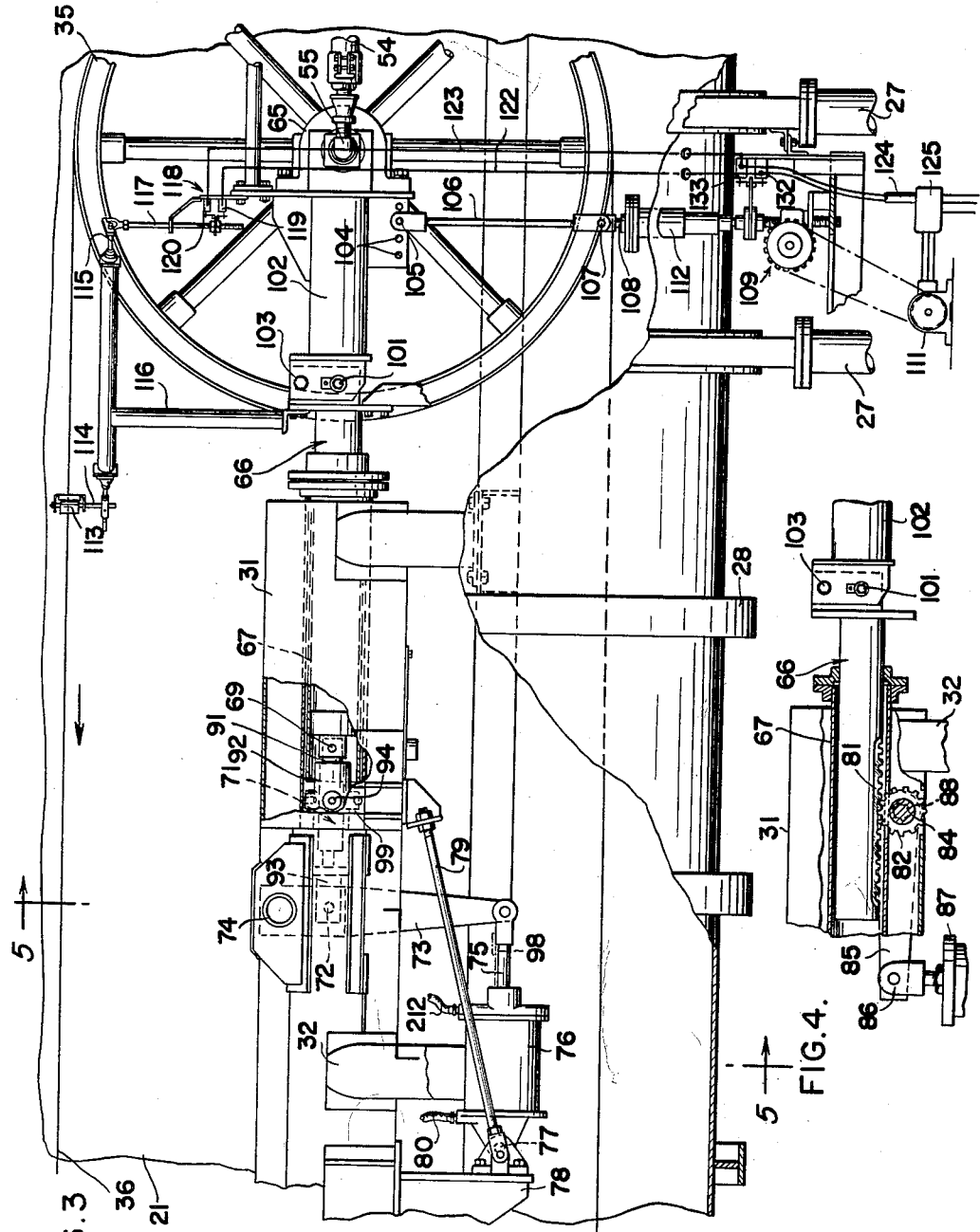

*INVENTORS*
WELD E. CONLEY
WENZEL P. KOPP
BY
*W. D. O'Connor*
ATTORNEY

Oct. 1, 1963 W. E. CONLEY ETAL 3,105,589
BELT ALIGNING AND TENSIONING APPARATUS
Original Filed Feb. 13, 1956 4 Sheets-Sheet 4
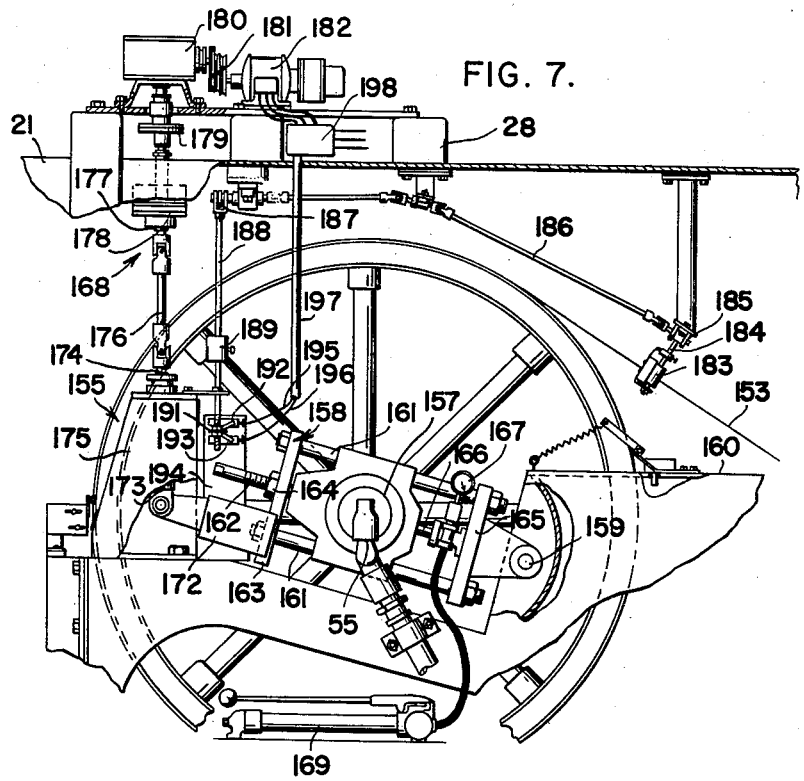
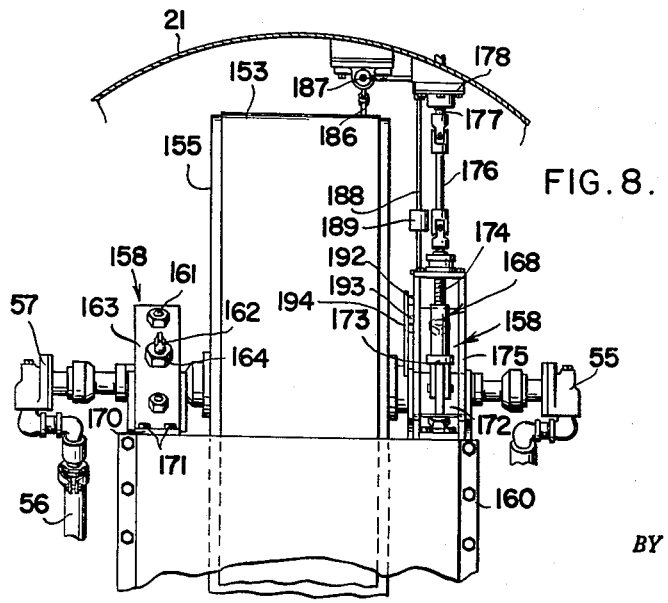
INVENTORS
WELD E. CONLEY
WENZEL P. KOPP
BY
ATTORNEY United States Patent Office 3,105,589
Patented Oct. 1, 1963

3,105,589
BELT ALIGNING AND TENSIONING APPARATUS
Weld E. Conley, Wauwatosa, Wis., and Wenzel P. Kopp, Madison, Ind., assignors to Chain Belt Company, Milwaukee, Wis., a corporation of Wisconsin
Original application Feb. 13, 1956, Ser. No. 564,996, now Patent No. 2,924,273, dated Feb. 9, 1960. Divided and this application Dec. 22, 1959, Ser. No. 861,316
16 Claims. (Cl. 198—202)

This invention relates, generally, to the art of belt aligning, and more particularly to improved apparatus for tightening or tensioning and for aligning or tracking a belt in running over cooperating drums or pulleys.

Conveyer belts and power transmitting belts running over drums or pulleys have a tendency to become misaligned and to run off the ends of their cooperating drums upon the occurrence of slight changes in operating conditions or changes in the belts or drums themselves, unless steps are taken to maintain proper alignment continuously. The well known expedient of maintaining alignment of a belt by crowning the cooperating pulleys is not always feasible or acceptable and other arrangements must be provided in such cases, as for instance when it is necessary that the belt be wide and flat and that therefore the drums be truly cylindrical.

Although the belt aligning and tensioning apparatus of this invention is adapted for use in connection with belt and pulley combinations of many types, it is illustrated for convenient understanding of its operation in the form in which it is utilized to guide the material conveying belt of a vacuum dehydrator of the drum and belt type more fully set forth and claimed in our copending application Serial No. 564,996 filed February 13, 1956, which issued February 9, 1960 as Patent No. 2,924,273, of which this application is a division and in copending application Serial No. 364,458, filed June 26, 1953, which issued February 9, 1960 as Patent No. 2,924,271, of which this application is a continuation-in-part.

As explained in the above mentioned patents material being dehydrated in the vacuum dehydrators there shown and described, is carried on a wide flat conveyer belt of stainless steel running over cylindrical heat exchanging drums. In each of the dehydrators of the above patents, the belt and its supporting drums are confined within a vacuum chamber and are therefore relatively inaccessible when the machine is operating in dehydrating material. Accordingly, it is highly desirable that proper provisions be made for maintaining the desired degree of tension in the belt and for insuring that it will track properly in running over the drums while operating for a considerable period of time without attention.

It is, therefore, a general object of the present invention to provide improved tensioning and tracking apparatus for a conveyer of the drum and belt type.

Another object of the invention is to provide improved apparatus for maintaining alignment of a conveyer belt in running over cooperating drums.

Another object is to provide an improved arrangement for maintaining a predetermined uniform tension in a conveyer belt.

Another object is to provide improved mechanism arranged to insure proper tracking of a conveyer belt in running over its supporting drums.

Another object is to provide improved belt tensioning and aligning apparatus for a belt operating over cooperating drums, wherein the belt tensioning movement is effected without disturbing the belt aligning movement.

Another object is to provide, in an apparatus including a belt operating over spaced drums, an arrangement for effecting relative radial movement of the drums for tensioning the belt and relative angular movement of the drums for aligning the belt.

Another object is to provide an improved belt tensioning and tracking arrangement wherein the belt tracking movement is effected in direction at right angles to the direction of belt tensioning movement.

A further object is to provide an improved belt aligning system in which misalignment of a belt is sensed at a portion thereof which is moved by the correcting action in a direction opposite to the direction of misalignment thereby to avoid over correction and obviate hunting.

A still further object is to provide a belt tracking arrangement in which the correcting movement to realign the belt effects cancellation of the misalignment sensing movement in a manner to prevent over correction.

According to this invention, a conveyer of the belt and drum type, including a belt running over spaced drums, is provided with improved belt tensioning and aligning apparatus whereby the aligning of the belt as it operates around the drums may be effected without changing the tightness of the belt and likewise the tensioning of the belt may be effected without interfering with the tracking of the belt upon the drums. This is accomplished by so arranging the apparatus that the belt alignment correcting movement takes place at right angles to the belt tensioning movement. For tensioning the belt, relative rectilinear movement between the drums in the common plane of their axes is utilized, while for tracking, the relative movement of the drums is angular and occurs in planes normal to the plane of the tensioning movement. Sensing of belt misalignment movement is effected along one edge of the belt at a position chosen for the reason that the resulting misalignment correcting movement of the drum effects movement of the belt edge at that point in direction opposite to the direction of the misaligning movement. This tends to cancel the sensing movement, the cancelling tendency being enhanced by movement of the tracking switch with the drum in the direction also tending to reopen its contacts. The prompt double cancelling of the sensing movement prevents over correction of the misalignment and avoids hunting action of the belt aligning apparatus.

The foregoing and other objects of this invention will become more fully apparent as the following detailed description of improved belt tensioning and tracking apparatus incorporated in vacuum dehydrators of the drum and belt type is read in conjunction with the accompanying illustrative drawings, wherein:

FIGURE 1 is a view in side elevation of a vacuum dehydrator of the belt and drum type embodying the belt tensioning and tracking apparatus of the present invention, most of the confining housing having been broken away to reveal the belt aligning mechanism;

FIG. 2 is an enlarged fragmentary view in side elevation of the movable heating drum shown in the left and of the housing in FIG. 1 and illustrating a modified supporting arrangement for one end of the movable drum.

FIG. 3 is an enlarged fragmentary view in side elevation of internal parts of the dehydrator, taken from the side opposite that shown in FIGS. 1 and 2, most of the housing and some parts of the frame having been broken away to reveal the belt tensioning and tracking mechanism;

FIG. 4 is a fragmentary view in elevation generally similar to parts of FIG. 3 but showing a modified form of the belt tensioning mechanism;

Figure 6:
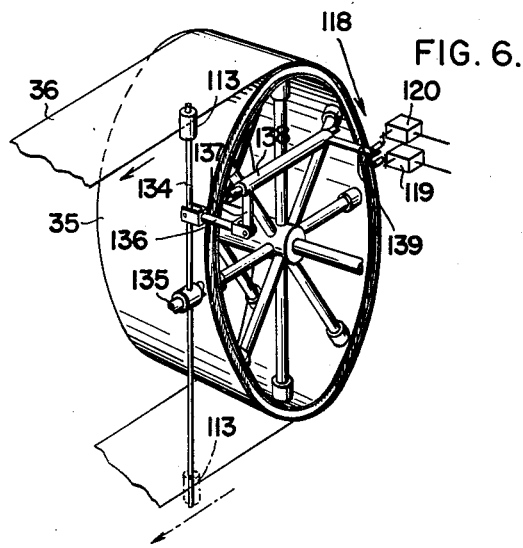

FIG. 6 is a view in perspective of the movable drum and associated tracking mechanism showing somewhat diagrammatically another version of the belt tracking follower device.

FIG. 7 is a fragmentary view in side elevation showing another form of movable drum supporting apparatus embodying a modified belt tensioning and tracking mechanism; and, FIG. 8 is a view in end elevation of the modified drum supporting and belt tracking structure shown in FIG. 7.

The particular belt and drum conveyer arrangement shown in the drawings to exemplify the new belt tensioning and tracking mechanism provided by the present invention, is in the form of a material carrying belt operating over a pair of spaced heat exchanging drums within a cylindrical housing constituting the vacuum chamber of a vacuum dehydrator. Although the belt tensioning and tracking mechanism of this invention has been utilized to great advantage in connection with continuously operating belt conveyers in vacuum dehydrators of the drum and belt type disclosed and claimed in the previously mentioned patents, it is to be understood that the new principles disclosed herein may be applied, with similar beneficial results, to belt conveyers generally as well as to various other cooperating combinations of belts and drums or pulleys.

Referring now more specifically to the drawings and particularly to the general view of the dehydrator shown in FIG. 1, the improved apparatus there illustrated as a typical operative embodiment of the present invention, comprises in general, a large cylindrical housing 21, that is closed at each end to form an air tight vacuum chamber for containing the material dehydrating mechanism. The right end of the housing, as shown in the drawing, is provided with a closure in the form of a separate dome or end-bell 22 that is removable to provide a large opening for introducing the operating mechanism into or removing it from the chamber. A covered opening or manhole 23 is provided in the dome 22 in order that entrance may be had into the housing for access to the operating mechanism within the chamber without removing the entire end-bell. The other end of the housing 21 is closed by a dome 24 that is fixed to the housing and which is likewise provided with a covered access manhole 25. The fixed dome 24 is furthermore provided with a large vacuum connection or exhaust conduit 26 constituting a suction line that is representative of a suitable evacuator or vacuum pump system which may operate automatically in a well known manner to maintain a predetermined degree of vacuum or low pressure atmosphere within the housing 21 when dehydrating material therein.

The entire apparatus is preferably supported upon a plurality of legs or posts 27 that engage the lower side of the housing 21 and support it in elevated position to provide room for discharging the dried product from the bottom of the housing. As shown in the drawing, the legs 27 are aligned with and secured to one or another of a plurality of spaced circumferentially arranged reinforming rings 28 that encircle the housing 21 and serve to strengthen it against the external atmospheric pressure encountered when the chamber is evacuated.

The improved belt tensioning and tracking mechanism is associated with a double drum and belt type material conveyer contained within the vacuum chamber 21 and that is in the form of unitary apparatus mounted on a long independent main frame 31 supported along each side by spaced outwardly inclined legs or struts 32 the lower ends of which bear upon brackets 33 fastened to the inside of the housing 21. As shown in FIG. 1 of the drawing, the frame 31 carries at its right end a large rotatably mounted cooling drum 34 and at its left end a heating drum 35 that in this instance is of similar size and is mounted both for rotation and for limited bodily movement relative to the frame 31. The spaced drums 34 and 35 carry an endless material conveying belt 36, preferably in the form of a continuous band of flat relatively thin flexible metal such as stainless steel that is trained around and operates over the two drums. In the particular dehydrator illustrated in FIG. 1 of the drawing, the belt 36 is about four feet wide and the drums are of truly cylindrical shape and each nearly eight feet in diameter. The drums 34 and 35 are spaced apart about thirty-five feet within the cylindrical housing 21 which is approximately fifty feet long overall and twelve feet in diameter.

The upper run of the belt 36 may be additionally supported to prevent sagging by a supporting element in the form of an idler roller 37 that is rotatably mounted upon the frame 31 about midway between the drums 34 and 35 in position to engage the lower surface of the upper strand of the belt. In order that the belt 36 may operate as a conveyer in carrying the material being dried through a drying cycle in the dehydrator, it is power actuated by means of a driving shaft 42 that carries a pair of spaced pinions 43, shown in FIG. 1 which mesh with complementary ring gears 44 mounted respectively on the opposite ends of the cooling drum 34. Ordinarily the belt 36 operates at a speed in the neighborhood of forty to fifty feet per minute, but it may be run either slower or faster to meet different operating conditions.

The material to be dried in the dehydrator is applied in liquid form to the outer or lower surface of the lower run of the belt 36 by means of a feeding roller 46 as the belt recedes from the cooling drum 34. As shown in FIG. 1 of the drawing, the feeding roller 46 is rotatably mounted within a feed pan 47 from which it transfers the liquid material onto the belt in the form of a thin film. In order that the belt 36 may be maintained in position to receive a film of material of predetermined thickness, there is provided a backup roller 48 that is rotatably carried by the frame 31. As more fully explained in the previously mentioned patents, the back-up roller 48 is disposed to engage the inner or upper surface of the lower run of the belt 36 at a point opposite from the feeding roller 46 in a manner to hold the belt flat and in an exact position relative to the feeding roller.

In the drying operation, the film of liquid material on the belt 36 is first carried by the belt beneath a preheater 51 that is constituted by a plurality of electrically energized radiant heaters, as more fully explained in the aforesaid Patent No. 2,924,273, which serves to precondition the film of material. The belt 36 then carries the film of material around the heating drum 35 which supplies heat for vaporizing most of the liquid constituent of the film into the low pressure atmosphere within the chamber 21. From the heating drum 35 the belt carries the nearly dry material beneath an afterheater 52 likewise constituted by a series of electrically operated radiant heaters which serve to complete the drying operation. After the material has been dried in this manner, the belt carries it around the cooling drum 34 which operates to chill the dried material in preparing it for removal from the belt. The cooled dried material is then scraped from the belt by means of a doctor blade 53 that engages the belt as it is about to leave the cooling drum.

The heating drum 35 which supplies most of the heat of vaporization to the film of material is preferably heated by steam that flows into it through a pipe 54 from a suitable source such as a steam boiler (not shown), the pipe 54 being connected to one end of the drum on its axis by means of a rotary coupling 55. As shown in FIG. 3, a similar pipe and rotary coupling connection at the other end of the drum serves to withdraw condensate resulting from the heating action of the steam. The cooling drum 34 is cooled by means of coolant fluid that circulates into it through a corresponding pipe 56 and an associated rotary coupling 57, a similar pipe and coupling connection at the other end of the drum serving to complete the coolant fluid circuit through the drum. The detailed structures of the cooling drum 34 and of the heating drum 35 with their connected circulating systems may be generally similar to corresponding drums shown and described in the previously mentioned Patent No. 2,924,271, the specific drum structure being more particularly set forth and claimed in a copending divisional application Serial No. 861,347, filed December 22, 1959.

As previously indicated, the cooling drum 34 is rotatably mounted in a fixed position at the right end of the frame 31 when viewed from the side shown in FIG. 1, whereas the heating drum 35 is rotatably mounted on the other end of the frame 31 in a manner providing for limited movement thereof relative to the fixed cooling drum in order to accommodate both tensioning and tracking of the belt 36. To this end, the cooling drum 34 is rotatably mounted between a pair of bearings 64 that are firmly fixed to the right end of the frame 31. On the other hand, the movable heating drum 35 is rotatably supported in a pair of bearings 65 that are carried respectively on the outer or distal ends of pivoted extensions on a pair of ram structures 66. As shown, the rams 66 are slidably mounted for longitudinal movement in the frame 31 to constitute spaced supporting elements that straddle and engage the respective ends of the drum 35 and are arranged to provide for radial, rectilineal adjusting movement of the drum 35 relative to the drum 34 in the common plane of their axes for tensioning the belt 36.

Figure 5:
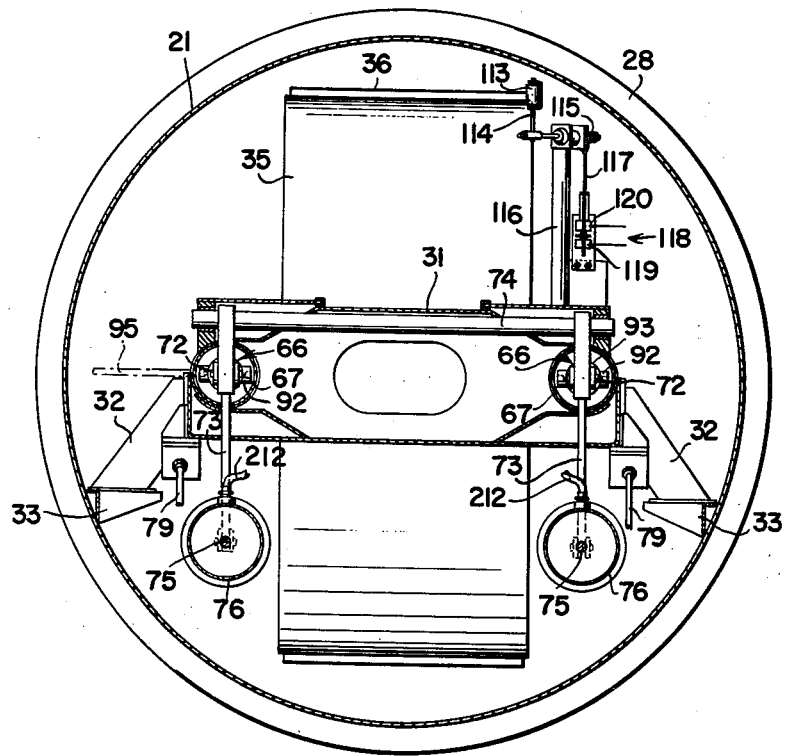
FIG. 5 is a view in transverse section through the dehydrator, taken on the plane represented by the lines 5—5 in FIGS. 1 and 3 and showing the tracking mechanism and the two interconnected tensioning mechanisms that operate respectively on the opposite ends of the movable drum.

Preferably, the tensioning action is accomplished by controlled fluid pressure operating to effect simultaneous movement of the two rams 66. As best shown in FIG. 5, the rams 66 are arranged in the horizontal plane of the axes of the two drums 34 and 35 and are spaced apart a distance greater than the width of the drums in order that they may engage and support the bearings 65 at the respective ends of the heating drum 35. As shown in FIGS. 3 and 5, the slidably mounted rams 66 are each received within a tubular sleeve or cylindrical bearing shell 67, the two sleeves being fixed in the outer edges of the frame 31 at the heating drum end thereof. To provide for accommodating belts of somewhat different lengths, the rams 66 are arranged to slide within the sleeve 67 in and out a distance of about twelve inches whereby the position of the heating drum may be established in accordance with the length of the particular belt 36 being used on the machine.

In order that the rams 66 may be moved by power, the inner end of each ram is connected by a pivot pin 69 to one end of a horizontally disposed adjustable connecting rod system or pitman element 71, the other end of which is connected by a pivot pin 72 at an intermediate position to a vertically disposed actuating lever 73 depending at the side of the frame 31. The two vertically disposed levers 73 at the respective sides of the frame 31 are carried on the opposite ends of a large transversely disposed shaft 74 that is journaled in the frame 31 just above the two connecting rods 71. The depending end of each lever 73 which extend to near the bottom of the frame 31, is pivotally connected to the outer end of a piston rod 75 that operates in a horizontally disposed double acting cylinder 76. Each cylinder 76 is in turn pivotally connected at its closed end by a pin 77 to a depending bracket 78 that constitutes part of the frame 31. As appears in FIGS. 3 and 5, each bracket 78 is braced against the reaction of its associated cylinder 76 by two parallel tie rods 79 that extend therefrom upward and forward to the main frame 31. By this arrangement, the levers 73 operate as levers of the second class with the lever arms so proportioned as to provide a substantial mechanical advantage to the piston rods 75 in moving the connecting rods 71. Thus, by exerting fluid pressure in the left end of each of the cylinders 76 as shown in FIG. 3 through a connecting conduit 80 the piston rods 75 are forced to the right, thereby moving the levers 73, the connecting rods 71 and the rams 66 to the right to tighten the belt 36.

As appears in FIG. 5, the transverse shaft 74 extends entirely across the frame 31 and is rigidly connected at its ends to the two depending levers 73 associated respectively with the two spaced rams 66. The shaft 74 constitutes a rigid member serving to interconnect the actuating mechanisms at the respective sides of the frame 31 in a manner to insure equal movement of the two rams 66 whereby both ends of the heating drum 35 are moved simultaneously and equally in tensioning the belt 36.

In accordance with a modified form of the tensioning structure that is shown in FIG. 4, each ram 66 may be provided along its lower surface with rack teeth 81 that mesh with pinions 82 fixed on a rigid transverse shaft 84. The shaft 84 corresponds generally to the transverse shaft 74 shown in FIGS. 3 and 5 in that it interconnects or interlocks the actuating mechanisms for the rams at the respective sides of the frame 31. In this modification, the shaft 84 has connected to each end a lever arm 85 that extends horizontally and is pivotally connected at its outer end to the upper end of a vertically disposed piston rod 86. Each piston rod 86 operates in a vertically positioned actuating cylinder 87, the arrangement being such that when the piston rods 86 are forced upward, the arms 85 are caused to turn the shaft 84 in clockwise direction whereupon the pinions 82 in mesh with the racks 81 urge the rams 66 to the right, as shown in the drawing, thereby moving the drum 35 to tighten the belt. In this arrangement, the connections of the arms 85 with the ends of the shaft 84 may be effected by means of spline connections 88 or the like whereby angular adjustments of the arms may be accomplished. This provides for changes in the position of the rams 66 relative to the piston rods 86 and lever arms 85 to take account of the length of the belt 36, whereby slack in the belt may be taken up before pressure is exerted through the cylinder 87 to tension the belt.

In the tensioning apparatus shown in FIG. 3, this adjustment of the position of the rams 66 relative to the actuating levers 73 is effected by lengthening or shortening the adjustable connecting rod elements 71. As shown, the portion of the connecting rod which engages the pivot pin 69 is in the form of a threaded shaft 91 which cooperates in telescoped threaded relationship with a cylindrical nut 92. The nut 92 is swiveled or rotatably connected at its other end to a shaft member 93 that is in turn connected by the pin 72 to the lever 73. The nut 92 is provided about its periphery with a plurality of spanner receiving holes of sockets 94 that may be engaged by an actuating instrument such as a spanner or lever rod 95 shown in dot dash lines in FIG. 5. By inserting the lever 95 in one of the holes 94 in the nut 92 the nut may be turned to lengthen or shorten the connecting rod element 71, the lever 95 being moved from one hole to the next as the nut is turned by increments.

One of the advantages of employing a material conveyer of the drum and belt type in a dehydrator arises from the fact that the smooth material carrying surface can be renewed readily simply by replacing the belt. When it is desired to replace the belt with a new one, a gauge plate or block 98 shown in dot dash lines in FIG. 3 is temporarily placed upon each of the piston rods 75, and the tensioning pressure then relieved from the cylinder 76 through the conduit 80. This permits each piston rod 75 and the connected actuating lever 73 to move to the left but only to the vertical position shown in the drawing, whereupon the gauge block 98 is clamped between the lever 73 and the end of the cylinder 76 thereby preventing further movement in the retracting direction.

With the actuating levers 73 thus blocked in the vertical position, each adjusting nut 92 is disposed directly behind a small cover plate 99 as shown on the side of the frame 31 in FIG. 1. Upon removing the cover plates 99, openings are presented in the sides of the frame 31 through which the levers 95 may be inserted to turn the nuts 92 as previously explained. To slacken the belt 36, the nuts 92 are turned in the direction to shorten each connecting rod element 71 thereby retracting the associated ram 66 into the frame 31 and moving the heating drum 35 inwardly toward the cooling drum 34. In effecting this movement, the two nuts 92 on the opposite sides of the frame 31 are turned simultaneously in order that both rams 66 may be retracted equally. When the rams have been retracted to their fullest extent, the belt 36 is quite slack and can then be cut through and removed from the drums. A new piece of belt material is then cut to length and placed about the drums 34 and 35 and its ends welded together to form a continuous endless web. The new belt is preferably made as long as it is possible to use in the dehydrator in order that it may include sufficient extra material to provide for shortening and re-welding subsequently in the event that a segment of it should be damaged in use.

After the welding is completed, the belt is centered on the drums and the two adjusting nuts 92 are turned simultaneously to advance the rams 66 out of the frame 31 for moving the drum 35 in the direction to tighten the belt. As the belt becomes taut, the two nuts 92 are carefully adjusted to insure that the degree of tightness is the same in both edges of the belt. After each of the nuts 92 has been properly tightened sufficiently, the cover plates 99 are replaced and fluid pressure is admitted from a pressure tank 100 on top of the housing 21, through the conduits 80 into the two actuating cylinders 76 to force the piston rods 75 and the levers 73 to the right as shown in FIG. 3.

The temporary gauge plates 98 are then removed from the piston rods 75 and the fluid pressure in the cylinders is regulated to establish the desired degree of tension in the belt 36. Since the nuts 92 have been tightened with the levers 73 in their central vertical positions, the levers are now free to swing in either direction from the central position as may be required to accommodate any change in the length of the belt 36 resulting from changes in temperature or other operating conditions. Inasmuch as the tensioning pressure exerted from the tank 100 through the conduits 80 into the cylinders 76 may be maintained constant, the tensioning action of the piston rods 75 remains constant and the tension in the belt is maintained constant regardless of changes in length or changes in the temperature and other operating conditions.

As disclosed in the previously mentioned patents, proper tracking of the belt 36 in running over the drums 34 and 35, is effected by tilting the movable heating drum 35 in a vertical plane that is perpendicular to the horizontal plane of tensioning movement. This is accomplished automatically in accordance with the present invention through operation of electrically actuated servo-motor mechanism. As best shown in FIG. 3, the ram 66, that appears on the near side of the frame 31 in that view, is pivotally connected at its outer end by means of a pivot pin 101, to an extending arm or swinging link 102 that carries at its outer or distal end the bearing 65 that supports the near end of the movable drum 35.

A second pin 103 disposed above the pivot pin 101 is loosely fitted in oversize holes in the arm 102 and in an upward extension at the outer end of the ram 66, respectively, in such a manner as to permit, but limit the extent of, vertical swinging movement of the arm or swinging link 102. The lower edge of the swinging link 102 is provided with a series of spaced holes 104, one or another of which is engaged by a pin 105 that connects the swinging link to the upper end of a vertically disposed tracking link 106. The lower end of the tracking link 106 is in turn pivotally connected by a pin 107 to the upper end of a tracker rod 108 extending upwards through the shell of the housing 21 from a motor driven tracker mechanism 109 that is mounted below the housing.

The tracker mechanism 109 is driven by a reversible motor 111, the arrangement being such that when the motor 111 is operated in the one or the other direction, the tracker rod 108 is caused to move upwardly or downwardly through operation of a screw and nut device or the like within the tracker mechanism 109. This results in pivoting the swinging link 102 vertically thereby tilting the drum 35 in the one or the other vertical direction as required to effect a correction in the tracking of the belt 36 in running over the drums. As appears in FIG. 3, since the motor 111 and the tracker mechanism 109 are mounted below the housing 21 and outside of the vacuum chamber, the vertically movable tracking rod 108 extends into the chamber through a suitable packing gland 112 that prevents leakage of air into the chamber.

The amount of lost motion between the pin 103 and the oversize holes in the ram 66 and in the swinging arm 102, is sufficient to permit the degree of pivoting movement of the arm necessary to accommodate the tilting movement of the drum 35 required in tracking the belt. When the length of the belt 36 is changed through replacement or re-welding, it may be necessary to change the point of connection of the tracking link 106. To accomplish this, the swinging link 102 is lowered by retracting the tracking rod 108 to the extent permitted by the lost motion at the limiting pin 103. With the weight of the drum 35 supported by the pin 103 in this manner, the tracking link 106 may be disconnected by withdrawing the pin 105 without danger that the drum 35 will be tilted too far.

The tracking link 106 is then moved to and aligned with the particular hole 104 in the swinging link 102 which disposes it in the most nearly vertical position when the belt is taut. The pin 105 is then replaced whereupon the tracking apparatus may resume operation. By this arrangement, the swinging link 102 and its associated lost motion pin 103 permit the required vertical tilting movement for the tracking action without changing the tension in the belt while the pivotally connected tracking link 106 permits the horizontal movement of the drum 35 required in tightening the belt without interfering with the operating of the tracking apparatus. The bearings 65 that support the ends of the drum 35 are preferably of the self-aligning type and arranged to permit limited canting of the drum 35 in effecting the tracking action without causing interference between the drum and the pivoted supporting arms 102 or binding between the rams 66 and their cooperating bearing cylinders 67.

The belt tracking action is governed by the movements of a belt follower roller such as the roller 113, as best shown in FIGS. 3 and 5. As there shown, the follower roller 113 is disposed in position to engage and roll upon the near edge of the upper run of the belt 36 in a manner to sense any misaligning movement of the belt as it passes by in running off of the heating drum 35. The follower roller 113 is rotatably mounted on the upper end of a vertical swinging arm 114 fixed to one end of a horizontal shaft 115 rotatably mounted in a bracket 116 carried by the upward extension of the drum supporting ram 66. The shaft 115 is connected at its other end to a horizontal lever arm that constitutes part of a vertically operating control linkage 117 that is connected with and actuates a double acting tracker control switch 118. Thus, when the belt 36 runs toward the far end of the drum 35, for example, and its near edge moves inward together with the follower roller 113, the sensing movement of the roller causes the shaft 115 to turn in the bracket 116 in direction to move the linkage 117 downward and the linkage thereupon operates to close a set of lower contacts 119 of the tracker control switch 118.

Conversely, when the belt 36 departs from the central position in the other direction, that is, toward the near end of the heating drum 35, the control linkage 117 operates upwardly to close a set of upper contacts 120 of the tracker switch 118. When actuated in this manner, the switch 118 controls the operation of the tracker motor 111 so that it effects tilting movement of the drum 35 in the correct direction to overcome the tendency of the belt to depart from its central position on the drum. As shown in FIG. 3, the switch structure 118 is carried by the swinging link 102, the arrangement being such that the correcting movement of the swinging link 102 moves the switch in the direction tending to reopen the switch contacts.

To effect this automatic correcting operation, electrical conductors in the form of cables 122 and 123 lead from the lower contacts 119 and the upper contacts 120, respectively, of the tracker switch 118, through a conduit 124 to a control box 125 that is operatively connected to control the tracking motor 111. By this arrangement, the tracker control switch 118 is connected to the tracker motor 111 in a manner providing for operation of the motor in forward or reverse direction, selectively.

As shown, the cable conductor 122 connected with the lower switch contacts 119 of the tracker switch 118, is also connected through a lower limit switch 132 associated with the tracker rod 108 of the tracker mechanism 109. In a similar manner, the conductor 123 connected with the upper contacts 120 of the tracker switch 118 is also connected through an upper limit switch 133, thus, when the lower tracker switch contacts 119 are closed, a circuit is completed which causes the tracker motor 111 to operate in a direction to move the pivotally mounted swinging link 102 and the near end of the drum 35 downwardly, the lower limit switch 132 serving to break the control circuit and stop the motor 111 in the event that the downward movement of the tracker rod exceeds a predetermined amount. Conversely, when the upper tracker switch contacts 120 are closed, a circuit is completed to operate the motor 111 in the direction to move the swinging link 102 upward, the upper limit switch 133 then serving to break the control circuit in the event of excessive upward movement.

In tracking the belt 36, the two contacts 119 and 120 of the tracker control switch 118 are actuated intermittently by operation of the follower roller 113 that senses the belt misaligning movements and when one or the other is closed, it remains closed only until the tracker jack mechanism 109, in responding, moves the arm or swinging link 102 (see FIG. 3) together with the drum, the belt edge and the switch 118 which the arm carries, a sufficient distance to effect reopening of the switch contacts. Therefore, this movement of the swinging link 102 has a double effect upon the closed contacts of the switch 118 tending to reopen them promptly. In the first place, the tilting action of the drum, in addition to effecting the corrective tracking action upon the belt, immediately moves the belt edge and the contacting follower roller 113 in the direction opposite to the sensing movement thereby tending to reopen the switch contacts. Furthermore, movement of the switch itself with the swinging link 102 is in the direction tending to reopen the contacts, as previously mentioned. This double cancelling action results in limiting the extent of the correcting movement and tends to prevent over correction which might otherwise occur if the switch contacts remained closed until the belt actually started to retreat from its misaligned position. Accordingly, this improved arrangement provides for quick response to misalignment while preventing hunting due to over correction.

If the belt should fail to return promptly to the central position, the contacts of the tracker control switch 118 will close again and the tracker jack will again operate to make an additional correction. If for some reason the tracker motor 111 should continue to operate until the tracker jack mechanism reaches the limit of its stroke before the tracker switch contact is opened, the jack will engage and open one or the other of the tracker limit switches 132 or 133 which will stop the tracker motor 111. When this occurs, the belt will usually return toward its central position by reason of the correcting action and in doing so will move the follower roller 113 in direction causing it to close the opposed tracker switch contact thereby energizing the tracker motor 111 for operation in the other direction which will result in reclosing the limit switch.

As explained in connection with FIG. 3 of the drawings and as may also be seen in FIG. 6, the follower roller 113 is positioned to engage the near edge of the upper run of the belt as it leaves the movable drum 35 at its tilting end, this particular position being chosen because of the fact that the tilting or correcting movement of the drum and belt edge at this point is opposite to the misaligning movement sensed by the follower roller. Thus, if the belt 36 runs off center toward the near end of the drums, the follower mechanism tilts this end of the drum 35 upward thereby moving the top edge of the drum and the belt edge in the opposite or inward direction and incidentally cancelling the sensing of misalignment. This correcting movement of the belt through tilting the drum 35 shifts the upper run thereof sidewise in a manner to present it at a slightly different angle to the other drum 34 at the other end of the machine thereby causing the belt to feed inwardly from the near end of the other drum 34 to correct the outward misalignment. At the same time, the lower edge of the tilted drum 35 moves inward relative to the lower run of the belt, thereby causing the lower run to feed outwardly toward the far end of the drum 35 which likewise operates to effect correction of the misalignment. In the same manner, when the belt runs off center toward the far ends of the drums, the movable drum end is tilted downward which has the effect of causing the upper run of the belt to feed inwardly onto the far end of the drum 34 and toward the near end thereof, the corrective action at the lower edge of the tilted drum being also in the direction opposite to the misaligning movement.

In the arrangement of the follower mechanism illustrated in perspective in FIG. 6, the follower roller 113 engaging the near edge of the upper belt run is shown rotatably mounted on the upper end of a relatively long swinging arm 134 that is pivotally mounted on a supporting pin 135 disposed substantially in the horizontal plane of the axis of the tilting drum 35. From the upper reach of the swinging arm 134, a connecting link 136 extends outward to the lower end of a lever arm 137 fixed to and depending from one end of a horizontal shaft 138, the link 136 being pivotally connected at each end to the arms to transmit therebetween the belt sensing swinging movement of the follower roller 113. At its other end, the horizontal shaft 138 is provided with a horizontally extending lever arm 139 that projects between and actuates the previously mentioned lower switch element 119 and upper switch element 120 of the double acting tracker control switch apparatus 118. Thus if the belt 36 tends to run off center toward the near ends of the drums, the swinging arm 134 is pivoted clockwise and the connecting link 136 causes the depending lever arm 137 and the shaft 138 to pivot counter-clockwise, whereupon the horizontal lever arm 139 moves upward and closes the upper switch element 120. This results in upward tilting movement of the near end of the drum 35 with the previously described double cancelling effect and belt tracking action that corrects the misalignment. Conversely, when the belt runs toward the far ends of the drums, the shaft 138 pivots clockwise and closes the lower switch element 119 to tilt the drum end downward and guide the belt toward the near ends of the drums.

This corrective action occurs in this manner with the belt running in the direction indicated by the solid-line arrow, that is, with the top run of the belt running off of the movable drum and being guided in running onto the other drum by the sidewise swinging movement resulting from tilting the drum 35. If now the direction of operation of the belt is reversed so that the top strand of the belt runs onto the movable drum 35 with the lower strand running off as indicated by the broken-line arrow, the guiding action is also reversed. Thus, when the belt tends to run off center toward the near end of the drum 35, it is necessary in effecting correction to tilt the near end of the drum downward thereby swinging the upper edge of the belt farther in the same direction in changing the belt angle for guiding it back onto the drum. While the change in direction of the tilting movement could be effected readily by interchanging the "up" and the "down" switches, the benefit of the cancelling action would be lost because the belt edge at the position contacted by the follower roller 113 continues to move in the misaligning direction as the immediate result of the corrective tilting movement, thereby tending to hold the switch closed instead of reopening it promptly.

As illustrated in FIG. 6, this difficulty is overcome by repositioning the follower roller 113 when the direction of belt movement is reversed, to engage it with the belt edge at a position thereon which has its correcting movement in direction opposite to the direction of misalignment. This is accomplished conveniently in the apparatus illustrated in FIG. 6 simply by removing the follower roller 113 from the top end of the long swinging arm 134 and then remounting it on the lower end of the arm 134 in contact with the near edge of the lower run of the belt 36 that is now running off of the drum, as indicated by the broken-line arrow, no other change being necessary. If now when the belt is run with the lower strand running off the drum 35, it should become misaligned and tend to run outward toward the near ends of the drums, the follower roller engaging the edge of the lower off running strand will move outward and the swinging arm 134 will pivot counterclockwise causing the depending arm 137 and shaft 138 to pivot clockwise. This will cause the horizontal arm 139 to move downward and close the lower switch element 119 and thereby tilt the drum end downward to guide the belt inwardly in running onto the other drum. The downward tilting movement causes the belt edge and the follower roller 113 to move inward immediately in direction opposite to the direction of misalignment movement whereupon the swinging arm 134 pivots clockwise and turns the shaft 138 counterclockwise to reopen the switch 119. The downward and inward pivoting movement of the drum 35 causes the lower strand of the belt to shift sidewise inwardly thereby guiding it to run inward on the other drum 34 for connecting the misalignment. Conversely, when the belt tends to run inward too far on the drums, the movable drum end is tilted upward to cause the lower strand to shift outwardly and the misalignment sensing to be cancelled and corrected as before explained.

Accordingly, regardless of the direction of operation of the belt and drums, if the sensing follower is applied to the belt edge in the region of the tilting drum and at a properly selected position, the corrective tilting movement of the drum will move the follower in the direction opposite to the misalignment movement thereby cancelling the corrective action to prevent over correction and hunting. As previously explained, this new result occurs in the belt aligning arrangement of this invention when the misalignment sensing follower is applied to the belt edge adjacent to the tilting end of the movable drum on the strand of the belt that is running off of the drum. While this improved tracking system is shown and described as controlling the operation of a conveyor belt in running over large drums in a vacuum dehydrator, it is to be understood that similar arrangements may be provided for controlling the tracking of other belts operating over drums or pulleys of other types.

The opposite end of the movable heating drum 35 may be supported as shown in FIG. 2, by means of a swinging link 142 that is pivotally connected by a pin 143 to the extending end of the corresponding ram 66, a lost motion connecting pin 144 being provided to permit limited swinging movement of the link 142 in a manner similar to that explained in connection with the other swinging link 102 shown in FIG. 3 to which the tracker mechanism is connected. In the case of swinging link 142 shown in FIG. 2, no vertical swinging movement is required during tracking and the link is accordingly supported by a supporting link or strut 146 of fixed length, the lower end of which is pivotally connected directly to the frame 31 by a pivot pin 147. The upper end of the link 146 is connected by a pin 148 that fits in any one of several holes 149 in a dependent portion of the swinging link 142. By this arrangement, the supporting link 146 permits sliding movement of the ram 66 in tightening the belt 36, the link 146 being disposed as nearly vertically as possible and connected to the arm 142 at one or another of the several holes 149 depending upon the length of the belt. Since the link 146 is equal in length to the link 106 at the other end of the drum 35, both ends of the drum will move along similar, generally horizontal paths when the two rams 66 are moved simultaneously.

As an alternative construction, the swinging link 142 may be dispensed with and the ram 66 at the end of the drum opposite the tracker mechanism may be provided with a rigid extension 152 in the manner shown in FIG. 1. In this instance, the ram 66 and its extension 152 form a rigid cantilever beam slidably mounted in the frame 31 for supporting the end of the heating drum 35 opposite that to which the tracker mechanism is connected.

In the previously mentioned patents and more particularly in Patent No. 2,924,271, the movably mounted drum and associated adjusting mechanism is also exemplified by the arrangement shown in FIGS. 7 and 8 of the present drawings. As there shown, a conveyer belt 153 generally similar to the previously mentioned belt 36, but much shorter, runs over a movable heating drum 155 generally similar to the heating drum 35. The drum 155 is rotatably mounted at its opposite ends in bearings 157, the housings of which are in turn slidably mounted in yokes or brackets 158. The brackets 158 constitute sub-frames that are pivotally connected by means of pins 159 to the sides of a frame 160 that corresponds generally to the main frame 31 shown in FIGS. 1 and 3.

As shown in FIG. 7 of the drawing, each sub-frame or yoke 158 comprises a pair of upper and lower guide bars 161 which pass through complementary openings in the associated bearing housing 157 to provide for sliding movement of the bearings along the yokes in a generally horizontal direction for moving the heating drum 155 in direction to tighten or loosen the conveyer belt 153. To maintain the slidably mounted drum supporting bearings 157 in adjusted position, each bearing housing is provided with a threaded rod 162 disposed parallel with and centrally of the guide bars or rods 161 and projecting through a hole in a plate 163 that is secured to the outer ends of the guide bars 161 in a manner to form the outer end of the yoke 158. A nut 164 threaded on the rod 162 may be tightened to bear against the end plate 163 for holding the bearing 157 outwardly to maintain tension in the belt 153. The inner ends of the guide bars 161 are connected to an end plate or base member 165 that forms the inner end of the yoke 158 and receives the pivot pin 159 which pivotally mounts the yoke or sub-frame 158 on the main frame 160.

When it is desired to establish the required operating tension in the belt 153, the bearings 157 are moved outwardly along the guide rods 161 through the action of hydraulic jacks 166 that are interposed temporarily between each bearing housing 157 and the associated base or inner end plate 165 that receives the pivot pin 159. As shown, each jack 166 has associated with it a pressure gauge 167 by means of which the pressure upon the bearing 157, and therefore, the degree of tension in the belt 153, may be ascertained with accuracy. A hand operated hydraulic pressure pump 169 is connected to each jack 166 to actuate it, the arrangement being such that by operating both pumps 169 simultaneously, the two bearings 157 at the opposite ends of the drum 155 may be advanced together.

The gauges 167 associated with the two jacks 166 are observed as the pressure is applied until both show predetermined readings indicating that the desired tension has been established in the belt 153. When the predetermined pressure has been achieved in the jacks 166, the nuts 164 are turned down on the threaded rods 162 until they bear against the outer end plates 163 and are then tightened somewhat until the gauges 167 indicate, by a reduction in pressure reading, that the forces restraining the bearings 157 in adjusted position are being assumed by the nuts 164. When this occurs, the hydraulic pressure exerted upon the jacks 166 may be relieved and the jacks then may be removed from the machine with assurance that the belt 153 is under the desired degree of tension for proper operation.

As in the case of the apparatus shown in FIGS. 1 and 3 tracking of the belt 153 on the drums is effected through tilting the movable drum 155 one way or the other as required by vertical pivoting action of one of the bearing supporting yokes or brackets 158 under the control of servo-motor mechanism 168 similar to the tracker mechanism 109 indicated in FIG. 3. As best shown in FIG. 8, the pivotally mounted yoke 158 that is shown at the left, although connected to the frame 160 by the pivot pin 159, is restrained from pivoting movement relative to the frame by means of an extending arm 170 that projects from the lower edge of the outer end plate 163 and is rigidly secured to the frame 160 by cap screws 171. On the other hand, the yoke 158 at the right in FIG. 8 is left free to pivot on its pivot pin 159 and is provided with an operating arm 172 that is secured to and extends from its outer end plate 163 and has pivotal connection at its outer end with the lower end of a nut element 173 that constitutes part of the servomotor or follower mechanism 168. The nut element 173 is threaded on a vertically disposed adjusting or elevating screw 174 that is rotatably mounted in a bracket 175 fixed on and projecting upward from the side of the frame 160.

When the screw 174 is rotated in the one or the other direction during operation of the follower controlled actuating mechanism 168, the nut 173 is moved up or down to raise or lower the outer end of the yoke 158, thereby tilting the right end of the drum 155, as shown in FIG. 8, to provide for correcting the tracking operation of the belt 153 in running over the drums as previously explained. It will be noted that in this arrangement of the belt tracking apparatus, the follower controlled actuating mechanism is applied to the movable drum at the end opposite that to which it is applied in the structure shown in FIGS. 1 and 3. However, this does not alter the operation of the apparatus in guiding the belt.

As best shown in FIG. 7, the upper end of the rotatable screw 174 is connected by means of a universal joint coupling or connector 176 to a shaft 177 extending upward through a packing gland or sealed bearing 178 in the top of the housing 21. The upper end of the shaft 177 is connected by means of a torque limiting or shear pin device 179 to and driven by an external gear reduction mechanism 180 that is in turn driven by a speed change belt transmission 181 from a reversible electric motor 182. As appears in FIG. 7, both the motor 182 and the gear reduction mechanism 180 of the tracking mechanism 168 are mounted on the top of the housing 21 outside of the vacuum chamber. By energizing the motor 182 for operation in the one or the other direction, the pivoted yoke 158 and the corresponding end of the movable drum 155 can be raised or lowered to tilt the drum for correcting the tracking of the belt. The bearings 157 are preferably of the self-aligning type to permit the limited canting of the drum shaft that occurs when the drum is tilted.

To control the belt tracking operation, there is provided a sensing follower roller 183 positioned to engage the near edge of the belt 153 that runs off of the drum at its tilting end, the roller being rotatably mounted on the lower end of an arm 184 that is pivotally mounted for swinging movement on a bracket 185 secured to and extending downward from the top of the housing 21. The arm 184 is arranged to control the belt tracking servomechanism 168 by its swinging movement under the influence of the shifting belt edge in engagement with the sensing roller 183 to register changes in the tracking of the belt 153 on the drums. This swinging movement is transmitted through a jointed shaft 186 to a horizontally disposed arm 187, shown best in FIG. 8, the outer end of which is connected to a vertically disposed control rod 188. The control rod 188 carries a weight 189 which functions to bias the arm 187 and the shaft 186 in direction to maintain the roller 183 in contact with the edge of the belt.

The lower end of the control rod 188 is provided with a control disc 191 that operates between an "up" switch 192 and a "down" switch 193 both mounted on a switch bracket 194 that is secured to the arm 172 on the pivoted bearing yoke 158. By this arrangement, when the belt 153 departs from its central position in direction to approach the near side of the drums, for example, as seen in FIG. 7, the sensing action of the roller 183 in following the belt edge turns the shaft 186 in direction to lift the control rod 188, whereupon the disc 191 effects closing of the "up" switch 192. Conversely, movement of the belt in the other direction causes the control rod to move down and close the "down" switch 193. Electrical conductors in the form of cables 195 and 196 lead from the "up" switch and the "down" switch respectively upward through a conduit 197 to a control box 198 associated with the tracking motor 182.

When the "up" switch 192 is closed as a result of misalignment toward the near end of the drum, it completes an electrical circuit through the conductor 195 that operates in the control box 198 to cause the motor 182 to turn in the direction causing the elevating screw 174 to lift the bearing yoke 158 for tilting the drum 155 in counterclockwise direction as seen in FIG. 8 to correct the belt tracking. This tilting movement of the drum 155 causes the upper run of the belt 153 to shift to the left and guides the belt to return gradually to its central position on the drum, as previously explained, but its immediate effect is to move the belt edge, the follower roller 183 and the control disc 191 in direction tending to open the "up" switch 192. Likewise the upward movement of the yoke 158 also effects movement of the switch bracket 194 in the same direction thereby moving the "up" switch 192 away from the control disc 191 which also tends to open the switch to thereby stop the motor 182. Thus both the tilting movement of the drum and belt follower, and the upward movement of the yoke and switch are in the direction tending to reopen the "up" switch 192. By this double cancelling arrangement, the correcting action initiated by the belt in moving the sensing roller 183, is quickly checked as a result of the two switch opening movements and over correction is thereby avoided.

In a similar manner, when the belt becomes misaligned in the other or far end direction, the "down" switch 193 is closed causing the yoke 158 to move downward thereby tilting the drum in the clockwise direction to correct the tracking and at the same time moving the belt and roller in direction tending to open the "down" switch and moving the switch itself away from the control disc 191 also in direction tending to cause it to open again. Accordingly, whenever the belt 153 moves appreciably to the one or the other side of the central running position on the drum 155, the follower control or servo-mechanism 168 operates automatically to effect limited tilting of the drum 155 in the proper direction to guide the belt back to its central position, the correcting effect being discontinued promptly by reason of the double cancelling action. The exact position at which the belt normally runs on the drums as the result of the guiding action of the servo-mechanism may be adjusted by adjusting the vertical position of the control disc 191 on the control rod 188.

By this arrangement, the tilting movement of the drum 155 in effecting tracking of the belt 153 may be accomplished without substantially changing the tension in the belt since the tracking movement is effected in direction transverse to the belt tightening movement. As a corrollary, the belt tensioning action can be effected by sliding the bearings 157 along the guide rods 161 without changing the tracking characteristics, since the direction of the tightening movement is transverse to the direction of the belt aligning movement.

As explained in the previously mentioned patents and as indicated in FIG. 1, there may be provided adjacent to the edges of the heating drum 35, a pair of limit switches 199 respectively disposed in position to be engaged by the one or the other edge of the belt 36, should it run off either edge of the drum. In like manner, limit switches 200 may be disposed adjacent to the respective edges of the cooling drum 34. By this arrangement, should the belt 36 run off either edge of either the heating drum 35 or the cooling drum 34 through failure of the tracking mechanism or of the tracker limit switches to function properly, it will contact and open the associated belt edge limit switch which will operate, as explained in the aforesaid patents to stop the belt before it is damaged.

As previously mentioned, in the belt tensioning arrangement shown in FIG. 3, the desired tension in the belt 36 is established and maintained by fluid pressure acting within the cylinders 76 and that is supplied through the conduit 80 from the pressure tank 100, the tension being adjusted as desired by varying the fluid pressure. The fluid pressure system for accomplishing this purpose is illustrated diagrammatically in FIG. 1 in which the conduit 80 is shown connecting the upper sides of the pressure ends of the cylinders 76, with the pressure reservoir or tank 100. The tank 100 is disposed in an elevated position relative to the cylinders 76, preferably on the top of the housing 21, as shown in FIG. 1. The fluid utilized for exerting pressure within the cylinders 76 is preferably water, to which the required pressure is applied by air under pressure, the tank 100 being only partially filled with water.

The air under pressure is supplied from a pressure source represented by a conduit 202 from which it flows through an adjustable pressure regulating valve 203 and then through a conduit 204 provided with a pressure gage into the top of the tank 100. The pressure exerted upon the water in the tank 100 is usually in the order of seventy or eighty pounds to the square inch gage and it may be regulated as desired by adjusting the regulating valve 203 thereby regulating the water pressure in the cylinders 76 and the tension in the belt 36. As previously explained, pressure in the closed ends of the cylinders 76 causes the rams 66 supporting the heating drum 35 to be moved outward, thereby tensioning the belt 36. Since the belt 36 is quite long, its length changes somewhat under different temperature conditions, but any change in length in the belt that may occur during operation of the dehydrator results merely in movement of the rams 66 and the piston rods 75 without effecting any appreciable change in the tensioning force exerted by the fluid pressure in the cylinders 76.

When it is desired to slacken the belt 36, the air under pressure from the source 202 may be shut off by closing a valve 209 in the pressure conduit after which a vent valve 210 connected with the conduit 204 may be opened. This releases the air pressure in the tank 100 thereby relieving the pressure on the water in the closed ends of the cylinders 76. A second pressure tank 211 mounted on the top of the housing 21 adjacent to the tank 100 is arranged to provide pressure for effecting retracting movement of the rams 66 and the heating drum 35 when it is desired to slacken the belt. As previously explained in connection with FIG. 3, the gauge blocks 98 may be interposed between the cylinders 76 and the levers 73 before the belt is slackened to position the levers vertically during adjustment of the positioning nuts 92.

As shown in FIG. 1, the second tank 211 is connected by a conduit 212 to the rod ends of the cylinders 76. In this instance, water under relatively low pressure is supplied to the cylinders, the pressure being exerted by air flowing through a pressure regulating valve 213 from a pressure source represented by a conduit 214. The valve 213 is connected by a conduit 215, provided with a pressure gage to the top of the tank 211 in such a manner that the air pressure exerted through it into the tank acts upon the water therein forcing it through the conduit 212 into the rod ends of the cylinders 76 for retracting the piston rods 75. Since the retracting action requires little force, a pressure in the order of ten pounds per square inch gage has been found sufficient in most instances.

After the belt tensioning mechanism has been retracted and the necessary adjustments to or replacement of the belt has been effected as previously described, the nuts 92 may be retightened and the retracting pressure may be cut off by closing a valve 216 in the conduit 214 and opening a vent valve 217 connected with the conduit 215. The gage blocks 98 are then removed and the belt 36 may then be tensioned as previously explained by opening the valve 209 to admit pressure into the tank 100 from which water under pressure is forced through the conduit 80 into the closed ends of the cylinders 76, the desired belt tensioning force being established by adjusting the pressure regulating valve 203.

From the foregoing description of the improved belt tensioning and aligning apparatus and the accompanying explanation of its mode of operation, it will be apparent that the new arrangement provided by the present invention is adapted to accomplish tensioning of a belt running over drums without disturbing its alignment and likewise to accomplish guiding of the belt upon the drums without disturbing its tightness. This favorable result is achieved in accordance with the invention by effecting the belt tracking movement of the movable drum in a direction transverse to the direction of the belt tightening movement. To this end, the belt is tensioned by relative radial movement between the drums outwardly in the common plane of their axes while tracking is effected by relative angular movement between the drums in axial planes perpendicular to the common axial plane of tensioning movement. Sensing of belt misalignment occurs on one edge of the belt at a portion thereof which moves, as a result of the corrective tilting action, in direction tending to cancel the sensing of misalignment thereby obviating hunting.

Although specific examples of particular belt tensioning and tracking apparatus illustrative of the present invention have been set forth in considerable detail by way of a full disclosure of useful embodiments of the invention, it is to be understood that other arrangements of the apparatus involving different structural features may be utilized by those familiar with the art of belt aligning without departing from the spirit and scope of the invention as defined by the subjoined claims.

The features of the invention having now been fully set forth and explained, we claim as our invention:

1. In a belt tensioning and aligning device for a conveyor of the belt type having a rigid frame carrying a pair of spaced belt supporting drums with a conveyor belt running over them, bearings rigidly mounted in said frame and arranged to support one of said drums, bearing carrying brackets mounted in said frame in a manner to support the other of said drums for tilting movement, bearings slidably mounted in said brackets for movement toward or from said first drum to tension said belt, said tilting movement of said drum being in direction transverse to the direction of tensioning movement of said bearings, means to secure said slidably mounted bearings in adjusted position in said brackets, and automatically operating belt tracking control apparatus arranged to respond to misalignment of said belt and operative to effect tilting movement of said tiltable drum in direction to correct the misalignment of said belt, the arrangement being such that the tensioning of said belt may be adjusted without disturbing the alignment and the alignment may be corrected without disturbing the tension.

2. In a belt tensioning and aligning device for a conveyor of the belt type having a rigid frame carrying a pair of spaced belt supporting drums with a conveyor belt running over them, bearings rigidly mounted in said frame and arranged to support one of said drums, bearing carrying brackets mounted in said frame in a manner to support the other of said drums for tilting movement, bearings slidably mounted in said brackets and arranged to support said movable drum for movement toward or from said first drum to tension said belt, said brackets being mounted to provide for tilting movement of said movable drum in direction transverse to the direction of tensioning movement of said bearings, means to secure said slidably mounted bearings in adjusted position in said brackets, and automatically operating belt tracking control apparatus arranged to respond to misalignment of said belt and operative to effect tilting movement of said movable drum in direction to correct the misalignment of said belt, the arrangement being such that the tensioning of said belt may be adjusted without disturbing the alignment and the alignment may be corrected without disturbing the tension.

3. In a conveyor of the belt type for carrying material, a rigid frame, a first drum rotatably mounted in said frame, a pair of spaced drum carrying bearings movably mounted in said frame, a second drum rotatably mounted between and in said spaced movably mounted bearings in cooperating parallel relationship with said first drum, a material carrying belt trained around and running over said cooperating drums, means to move said movable drum carrying bearings generally radially outwardly and inwardly relative to said first drum to apply desired tension to said belt, and automatically operating belt tracking control apparatus arranged to respond to misalignment of said belt in running over said drums and operative thereupon to move one of said movable bearings in a direction substantially transverse to the direction of belt tensioning movement of said bearings to tilt said second drum to effect tracking alignment of said belt in running over said drums, the arrangement being such that the tensioning adjustment of said belt may be effected without disturbing the tracking alignment and the tracking alignment may be effected without disturbing the tensioning adjustment of said belt.

4. In a belt conveyor for carrying material, a rigid frame, a first drum rotatably mounted in said frame, bearing carrying brackets mounted in said frame in spaced relationship and extending outwardly from said frame in a generally radial direction relative to said first drum, means pivotally mounting one of said brackets to said frame, bearings slidably mounted in said brackets for movement toward or from said first drum, a second drum rotatably mounted in said slidably mounted bearings between said brackets and in cooperating, generally parallel relationship with said first drum, a material carrying belt trained around and running over said cooperating drums, fastening means arranged to secure said slidably mounted bearings in adjusted position in said brackets, whereby said second drum may be positioned to apply desired tension to said belt, and automatically operating control means arranged to pivot said pivotally mounted bracket to effect tracking of said belt in running over said drums.

5. In a conveyor of the belt and drum type, a rotatably mounted first drum, ram means, means for actuating said ram means, links operatively connected to said ram means, one of said links being pivoted for movement transversely relative to said ram means, bearings carried by the distal ends of said links, a second drum mounted in said bearings, said ram means and said links being positioned upon actuation of said ram means to cause said second drum to be moved in a direction away from said first drum whereby said second drum may be moved to apply desired tension to the said belt, and control means arranged to pivot said pivotally mounted link transversely and thereby tilt said second drum in a manner to effect training of said belt in running over said drums, said pivoting movement being in direction to effect tilting of said second drum in a plane at right angles to the plane of movement of the said drum upon actuation of said ram means.

6. In a belt tensioning and tracking apparatus, a rigid frame, a pair of drums rotatably mounted in said frame, an endless belt trained around said drums, means for moving one of said drums relative to the other in a direction to tension said belt, and means for moving one end of one of said drums in a direction transverse to the direction of the belt tensioning movement of said one drum to tilt said drum to effect tracking alignment of said belt in running over said drums, the arrangement being such that the tensioning of said belt and the tracking thereof may be accomplished without mutual interference.

7. In a belt type of conveyer for carrying material, a rigid frame, a first drum rotatably mounted in said frame, rams slidably mounted in said frame in spaced relationship for sliding movement generally radially of said first drum, links connected respectively to and constituting extensions of said rams, means pivotally connecting one of said links to one of said rams for transverse swinging movement, bearings mounted on the distal ends of said links, a second drum rotatably mounted in said bearings and between said rams and links in cooperating parallel relationship with said first drum, a material carrying belt trained around and running over said cooperating drums, pressure means to urge said slidably mounted rams outwardly from said first drum in said frame, whereby said second drum may be moved to apply desired tension to said belt, and automatically operating control means arranged to pivot said pivotally mounted link transversely and thereby tilt said second drum in a manner to effect training of said belt in running over said drums by pivoting the said second drum in a plane at right angles to the plane of said rams and drum axis.

8. In apparatus for tensioning and tracking a belt running over spaced drums, a pair of drums rotatably mounted in generally parallel spaced relationship, an endless belt trained around said drums, means for effecting relative movement of said drums in a direction to tension said belt, and means for effecting relative tilting of said drums in a direction transverse to the direction of the belt tensioning movement to thereby effect tracking alignment of said belt in running over said drums, the arrangement being such that the tensioning of said belt and the tracking thereof may be accomplished without interfering with each other.

9. In a conveyor of the belt and drum type, a plurality of spaced drums, a material carrying belt arranged to run over said spaced drums, a supporting frame for said spaced drums arranged to rotatably support one of said drums directly, spaced supporting elements movably mounted on said frame and arranged to rotatably support the respective ends of another of said drums, power-operated actuating mechanisms arranged to actuate said spaced supporting elements, respectively, adjustable linkage operatively connecting each power-operated actuating mchanism to its respective supporting element for movement thereof generally radially relative to said directly supported first mentioned drum, interconnecting mechanical linkage operatively connecting together said power-operated actuating mechanisms for synchronized movement, and tracking apparatus operatively connected to move one of said spaced supporting elements in direction substantially transversely of said radial movement, the arrangement being such that both ends of said movable other drum are moved simultaneously in a radial direction in adjusting the tension in said belt through operation of said power-operated actuating mechanisms and their interconnecting linkage, while individual movement of one of said drum ends in a direction substantially transverse to the direction of tensioning movement for aligning said drum with said belt may be effected through operation of said tracking apparatus.

10. In a conveyer of the belt and drum type, a supporting frame, a drum rotatably mounted on said frame, a movable second drum disposed in parallel spaced relationship with said first drum, a pair of rams disposed in parallel spaced relationship and arranged for sliding movement on said frame, each of said rams having rack teeth arranged longitudinally thereof, a pinion mounted to mesh with said rack teeth of each of said rams, a rigid shaft interconnecting said two pinions to ensure synchronized movement of said two rams, a pair of arms connected, respectively, to the ends of said rams, one of said arms being pivotally connected thereto to constitute a hingedly mounted extension thereof, bearings mounted on said arms to rotatably support said movable second drum, a conveyer belt arranged to run over said two drums, belt tracking mechanism responsive to misalignment of said belt and operative to pivot said pivoted arm for tilting said movable second drum to correct the misalignment, and tensioning means arranged to exert torque upon said rigid shaft in a direction to force said rams and said movable second drum in a direction away from said first drum to tension said belt.

11. In a belt and pulley apparatus, a belt pulley, bearings rotatably supporting said pulley for rotation upon its axis and for tilting movement of its axis, a belt trained to operate over said pulley, power-actuated tilting means operatively connected to one of said pulley bearings to tilt said pulley to correct the tracking of said belt in running over said pulley, and belt position sensing control means responsive both to misalignment of said belt upon said pulley and to the corrective tilting movement of said pulley and operatively connected to energize said power-actuated tilting means in response to belt misalignment to effect corrective tilting of said pulley and to deenergize said power-actuated tilting means in response to the corrective tilting movement of said pulley, whereby corrective tilting of said pulley may be effected promptly to guide said belt and is likewise promptly discontinued in order that overcorrecting tilting movement may be avoided.

12. In an improved belt tracking apparatus for guiding a belt in running over a drum, power-actuated means operatively connected to tilt said drum to correct tracking of said belt in running over said drum, a follower member arranged to cooperate with one edge of said belt in the region of said drum to sense misalignment of said belt relative to said drum, and a control system responsive to misalignment of said belt as sensed by said follower member and operative in accordance therewith to control said power-actuated means in a manner to cause it to tilt said drum correctively in the direction to move said drum and said sensed belt edge in the direction opposite to the direction of the misalignment sensed by said follower member thereby neutralizing the sensing of misalignment, the arrangement being such that the tilting action to correct tracking of said belt in running over said drum continues only until the sensing of said follower member is neutralized by reason of the corrective tilting movement.

13. In a belt aligning mechanism for guiding the tracking of a belt in running over a cooperating drum, the combination with a movably mounted drum and a cooperating belt running over said drum, of power-operated correcting mechanism arranged to tilt said drum to effect guiding of said belt, control mechanism responsive to misalignment of said belt on said drum and operative in response thereto to actuate said power-operated correcting mechanism to tilt said drum in the direction tending to restore said belt to a predetermined running position, and a belt follower member operatively connected to actuate said control mechanism in response to the misalignment of said belt and disposed to sense the position of an edge of said belt at a point adjacent to the portion of said drum which moves in the direction opposite to the direction of misalignment of said belt in effecting the tracking correction, the arrangement being such that when said follower member is actuated by misaligning movement of the aforesaid edge of said belt, the resulting correcting movement of said drum simultaneously moves said sensed belt edge in the direction to neutralize immediately the sensing of misalignment by said follower member, thereby avoiding overcorrection in returning said belt to its aligned position on said drum.

14. In an improved belt aligning mechanism for a belt running overspaced drums, one of which is mounted for bodily tilting movement, power-actuated means operatively connected to one end of said movable drum for tilting said drum in an axial plane substantially perpendicular to the plane of operation of the run of said belt running off of said movable drum in a manner to guide said belt in running on to the other of said drums, and misalignment sensing follower control mechanism disposed to cooperate with the edge of said off-running belt adjacent to the end of said tilting drum connected to said power-actuated means to sense misalignment of said belt and operatively connected to control said power-actuated drum tilting means in response to misalignment sensed in a manner to effect tilting of said movable drum in direction to shift said off-running belt edge immediately in direction opposite to its direction of misalignment sensed by said follower, the arrangement being such that said corrective tilting movement shifts said belt sidewise to guide it in running on to said other drum in the direction to correct the sensed misalignment and to move said sensed belt edge in the direction effecting immediate cancellation of the misalignment sensing of said follower mechanism, thereby to avoid over correction and hunting.

15. In an improved belt tensioning and tracking system for a belt trained over cooperating pulleys, the combination with a bodily movable pulley and a belt cooperating therewith, of a belt tensioning and tracking apparatus including mechanism arranged to move said pulley bodily in belt tightening direction, pressure establishing means operating on said pulley moving belt tensioning mechanism in a manner to establish a predetermined uniform tension in said belt, mechanism arranged to tilt said pulley bodily in a plane of its axis perpendicular to its direction of belt tightening movement for guiding said belt thereon without interfering with the predetermined uniform tension established therein, a belt follower arranged to respond to changes in position of said belt in running over said pulley, and control mechanism responsive to said belt follower and operative upon said pulley tilting mechanism to cause said mechanism to tilt said pulley in the direction to correct any misalignment sensed by said belt follower, the arrangement being such that intermittent belt tracking tilting movements occur without disturbing the belt tension and likewise changes in the belt tension may be effected without disturbing the belt tracking operation.

16. In a belt tensioning and tracking system, a frame, a belt receiving drum rotatably mounted in said frame, a cooperating drum movably mounted in said frame for rotary and bodily movement in belt carrying relationship with said first drum, a belt trained over said cooperating drums, a pair of rams slidably mounted in said frame for movement toward or from said first drum, an arm pivotally mounted on and constituting the distal end of one of said rams, bearings carried by the distal ends of said rams in position to engage and rotatably support the respective ends of said bodily movable drum, power operated means arranged to move said rams simultaneously for adjusting the position of said bodily movable drum to regulate the tension in said belt running over said drums without affecting belt alignment, belt follower mechanism disposed to sense misalignment of said belt in running over said drums, and actuating apparatus operatively connected to be controlled by said belt follower mechanism and connected to said pivotally mounted arm of said one ram in a manner to pivot said arm and its bearing for tilting said bodily movable drum in response to sensing of belt misalignment by said belt follower mechanism, the tilting movement being in direction to effect correction of the sensed belt misalignment and occurring without affecting the belt tension established by operation of said ram moving means.

References Cited in the file of this patent

UNITED STATES PATENTS

| | | |
|---|---|---|
| 1,023,253 | Keith | Apr. 16, 1912 |
| 1,347,121 | Rice | July 20, 1920 |
| 1,469,689 | Prius | Oct. 2, 1923 |
| 2,075,111 | Gulliksen et al | Mar. 30, 1937 |
| 2,256,685 | Parker | Sept. 23, 1941 |
| 2,291,830 | Obenshain | Aug. 4, 1942 |
| 2,304,843 | Nordquist | Dec. 14, 1942 |
| 2,600,273 | Seifried | June 10, 1952 |
| 2,709,588 | Staege | May 31, 1955 |
| 2,788,883 | Schwenk | Apr. 16, 1957 |
| 2,924,273 | Conley et al. | Feb. 9, 1960 |
| 2,939,571 | Robertson | June 7, 1960 |

FOREIGN PATENTS

| | | |
|---|---|---|
| 506,355 | Great Britain | May 26, 1939 |